United States Patent
Stone et al.

[15] 3,678,724
[45] July 25, 1972

[54] HYDRAULICALLY OPERATED METAL FORMING MACHINE

[72] Inventors: Guthrie B. Stone, Honeoye; William F. Holmes, Springwater, both of N.Y.

[73] Assignee: Springwater Manufacturing Co., Inc.

[22] Filed: Jan. 9, 1970

[21] Appl. No.: 1,805

[52] U.S. Cl. ............................................. 72/324, 83/574
[51] Int. Cl. .................. B21d 43/28, B21k 27/06, B26d 5/08
[58] Field of Search ............ 29/560, 560.1; 72/324; 83/574, 83/198, 620, 580, 701, 412, 158

[56] References Cited

UNITED STATES PATENTS

| | | | |
|---|---|---|---|
| 1,006,761 | 10/1911 | Kraut | 83/620 |
| 1,337,147 | 4/1920 | Morris | 83/574 |
| 2,949,943 | 8/1960 | Islandsrud | 83/701 |
| 2,053,309 | 9/1936 | Yeager | 72/324 |
| 2,456,749 | 12/1948 | Steibel | 72/412 |
| 2,614,605 | 10/1952 | Senna | 72/158 |
| 434,231 | 8/1890 | Babcock | 29/560.1 |

Primary Examiner—Charles W. Lanham
Assistant Examiner—R. M. Rogers
Attorney—Clarence A. O'Brien and Harvey B. Jacobson

[57] ABSTRACT

An elongated machine bed pivotally displaceable between vertical and horizontal positions on a movable base. A reciprocable blade is slidably mounted on the bed for advancement toward a die block adjustably positioned on the bed for punching and bending operations. A fixed blade in sliding contact with the moving blade is utilized for shearing operations.

20 Claims, 13 Drawing Figures

Patented July 25, 1972
3,678,724
6 Sheets-Sheet 1
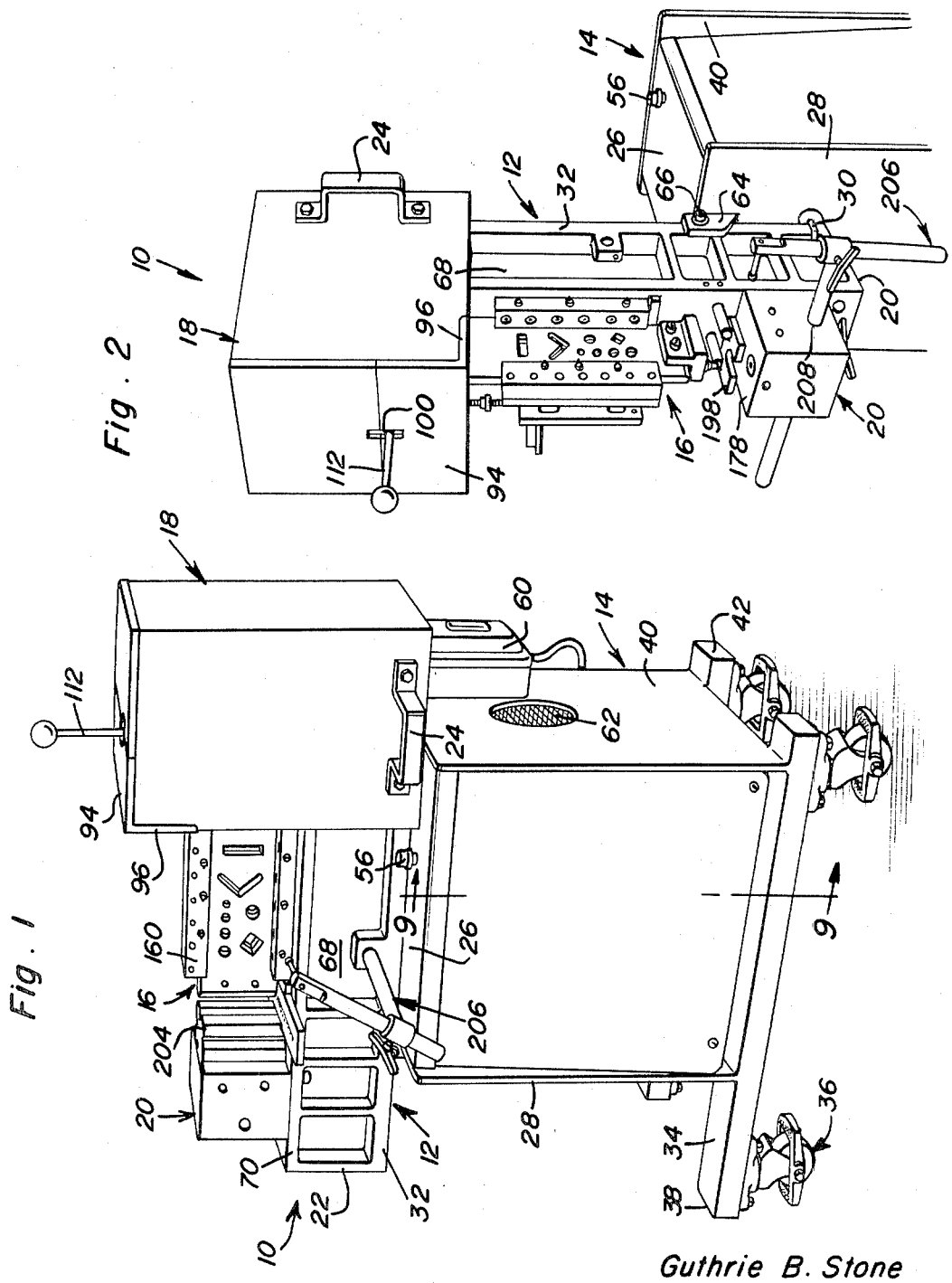
Guthrie B. Stone
William F. Holmes
INVENTORS
BY Clarence A. O'Brien
and Harvey B. Jacobson
Attorneys

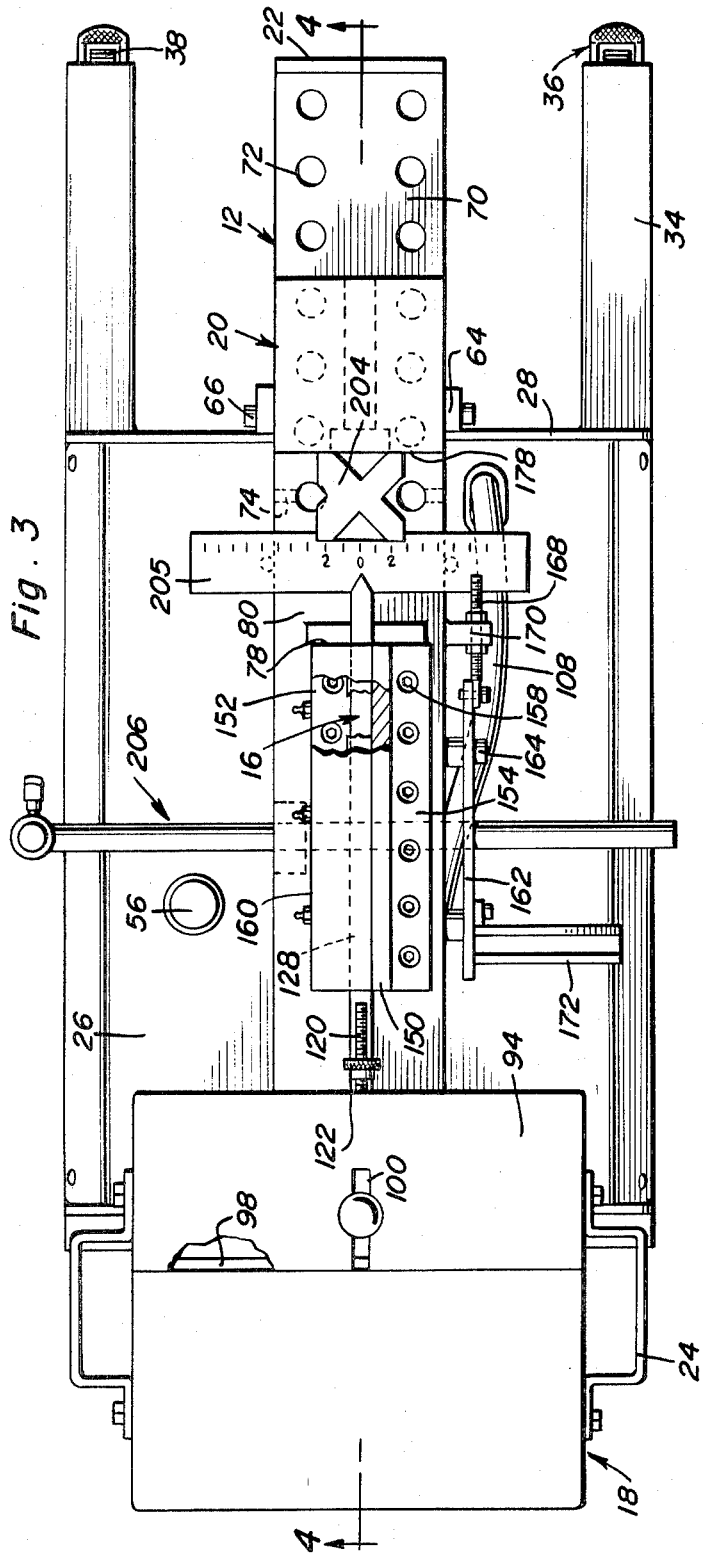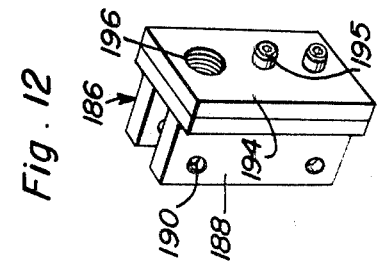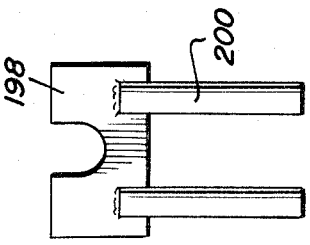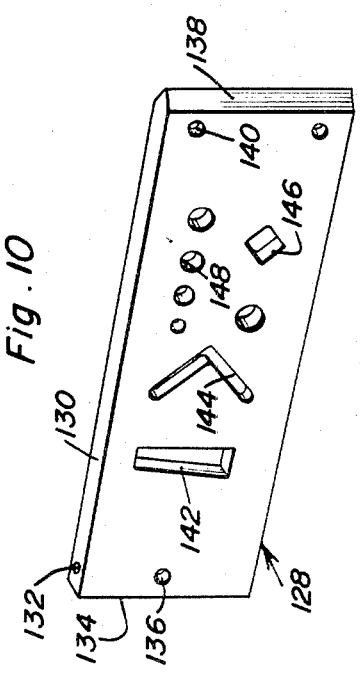
Guthrie B. Stone
William F. Holmes
INVENTORS Guthrie B. Stone
William F. Holmes
INVENTORS

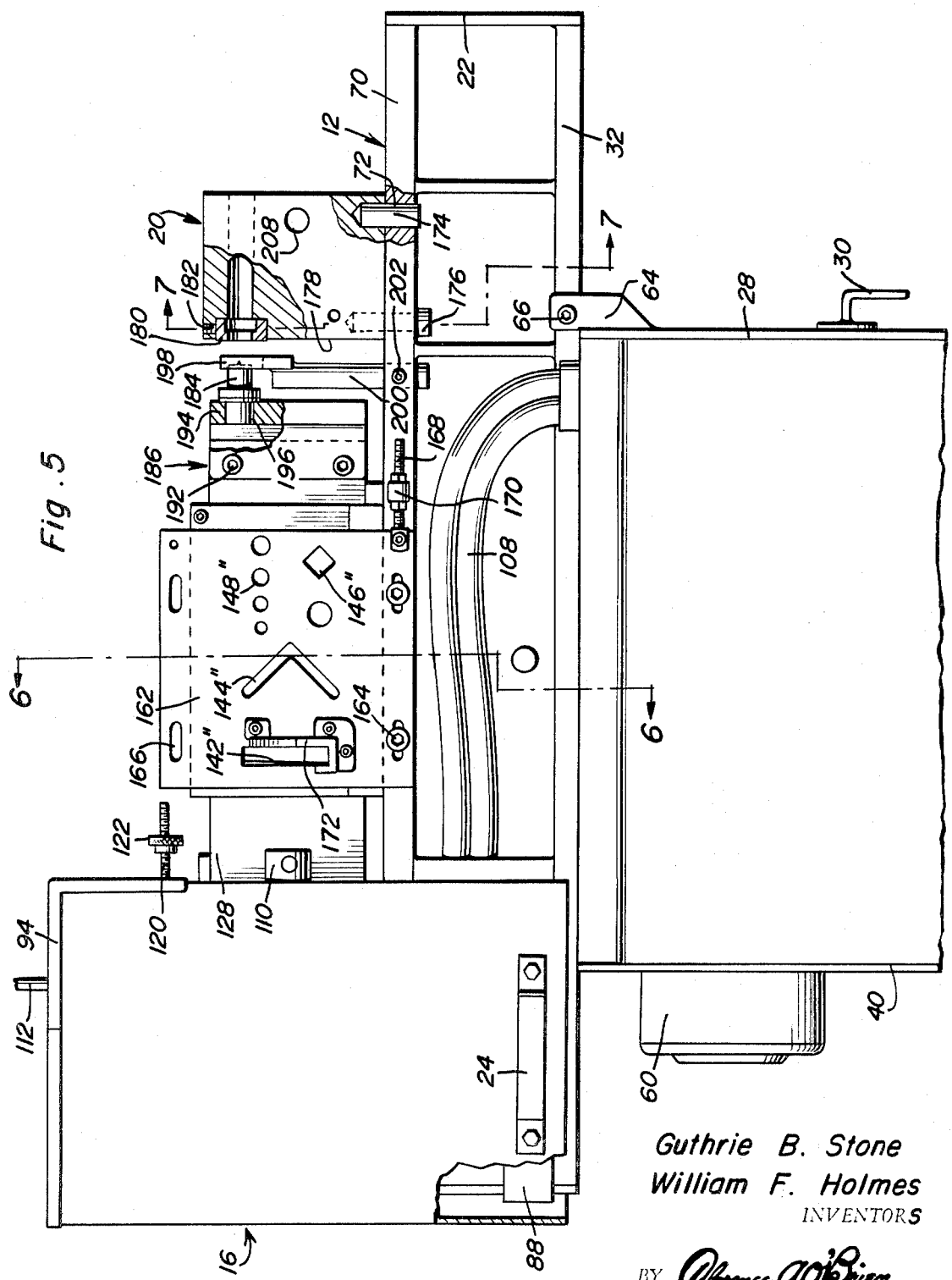

Patented July 25, 1972
3,678,724
6 Sheets-Sheet 5
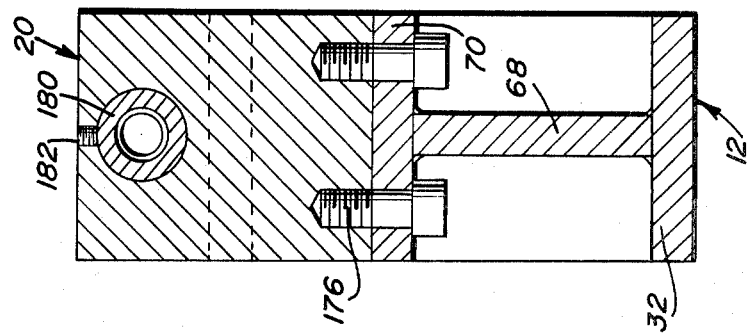
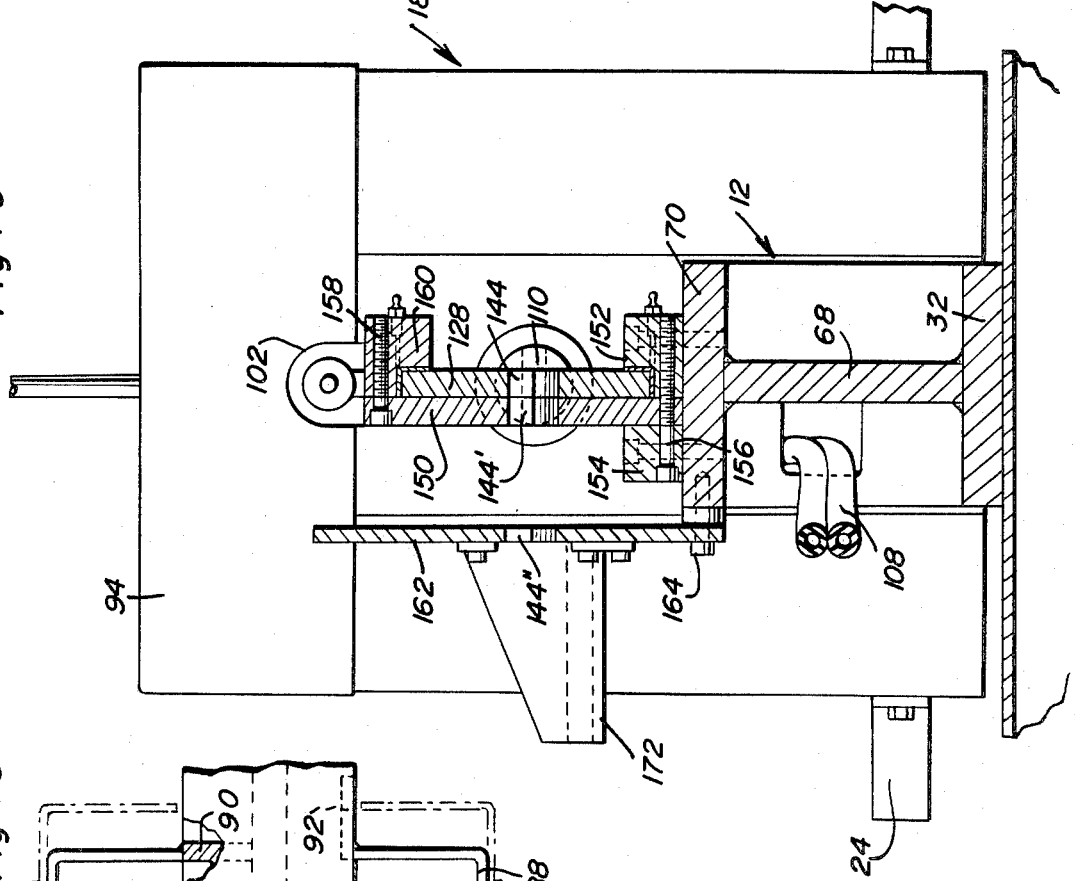
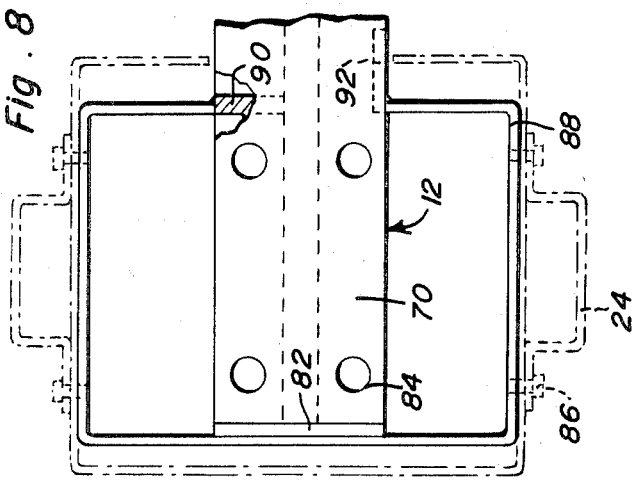
Guthrie B. Stone
William F. Holmes
INVENTORS
BY Clarence A. O'Brien
and Harvey B. Jacobson
Attorneys Patented July 25, 1972

Guthrie B. Stone
William F. Holmes
INVENTORS

BY *Clarence A. O'Brien*
*and Harvey B. Jacobson*
Attorneys 3,678,724

HYDRAULICALLY OPERATED METAL FORMING MACHINE

This invention relates to a multipurpose, metal forming machine capable of performing operations such as shearing, punching, bending, notching, etc.

At the present time, separate metal forming machines are specially designed for performing different metal forming operations such as shearing, punching and bending. Generally, one type of metal forming machine is unsuitable for the other types of metal forming operations because of workpiece space requirements, accessibility to the work supporting surface and the stroke distance of the movable ram. Thus, where various different metal forming operations must be performed, a relatively high investment in machinery is required even though the frequency with which the various different metal forming operations are performed, do not warrant such expediture. Accordingly, there is often a loss in time in subcontracting the performance of certain metal forming operations in the manufacture of metal parts. A need therefore exists for an effective, multipurpose metal forming machine.

In accordance with the present invention, a multipurpose metal forming machine is provided which features a single moving blade guided along one longitudinal edge on an elongated bed relative to a base die block which is adjustably positioned on the bed. The moving blade is reversible in its mounting on the bed so as to interchangeably present different cutting edges for shearing operations. A fixed blade is mounted on the bed in sliding contact with the moving blade for shearing purposes, the shearing function being thereby performed without material loss. An adjustable stock guide is provided for support of stock during the shearing operation in order to obtain an accurate square cut as well as to facilitate the positioning of the stock.

For punching and bending purposes, the base die block features a built-in die holder thereby eliminating costly die shoes and also provides a support for a length gauge in connection with end stopping during the punching and shearing operations.

The bed on which the blades, die block and power operated piston mechanism, are mounted, is pivotally connected to a mobile base so that the bed may be displaced relative to the base between horizontal and vertical positions. Thus, in the vertical position, a levelled horizontal work supporting surface is provided by the die block in order to utilize gravity for holding the workpiece in position for punching operations. Gravity may also be utilized to align a work piece on a horizontal bed surface perpendicular to the bending die surface when the bed is in a horizontal position thereby eliminating the need for guides as in the case of press brake bending machines.

Various metal engaging tools and implements may be utilized in conjunction with the metal forming machine of the present invention including adapters mounted at the forward end of the moving blade, strippers mounted on the bed and projecting between the blade and the base die block and repositionable bending dies held against the die block. The adjustable positioning of the base die block on the bed offers a variable shut height for large dies and permits use of different die sets to perform different operations such as coping and notching.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing the metal forming machine of the present invention in a horizontal position.

FIG. 2 is a partial perspective view showing the machine in a vertical position.

FIG. 3 is a top plan view of the machine as shown in FIG. 1.

FIG. 5 is a partial side elevational view of the machine in a horizontal position with parts broken away and shown in section.

FIG. 6 is a partial transverse sectional view taken substantially through a plane indicated by section line 6—6 in FIG. 5.

FIG. 7 is a transverse sectional view taken substantially through a plane indicated by section line 7—7 of FIG. 5.

FIG. 8 is a partial top plan view of the machine bed with the housing enclosing the power operated piston mechanism shown in dotted line.

FIG. 10 is a perspective view of the movable blade associated with the machine.

FIG. 11 is a front elevational view of the stripper implement shown mounted on the machine in FIG. 5.

FIG. 12 is a perspective view of a punch carrying adapter to be mounted on the moving blade as shown in FIG. 5.

Figure 4:
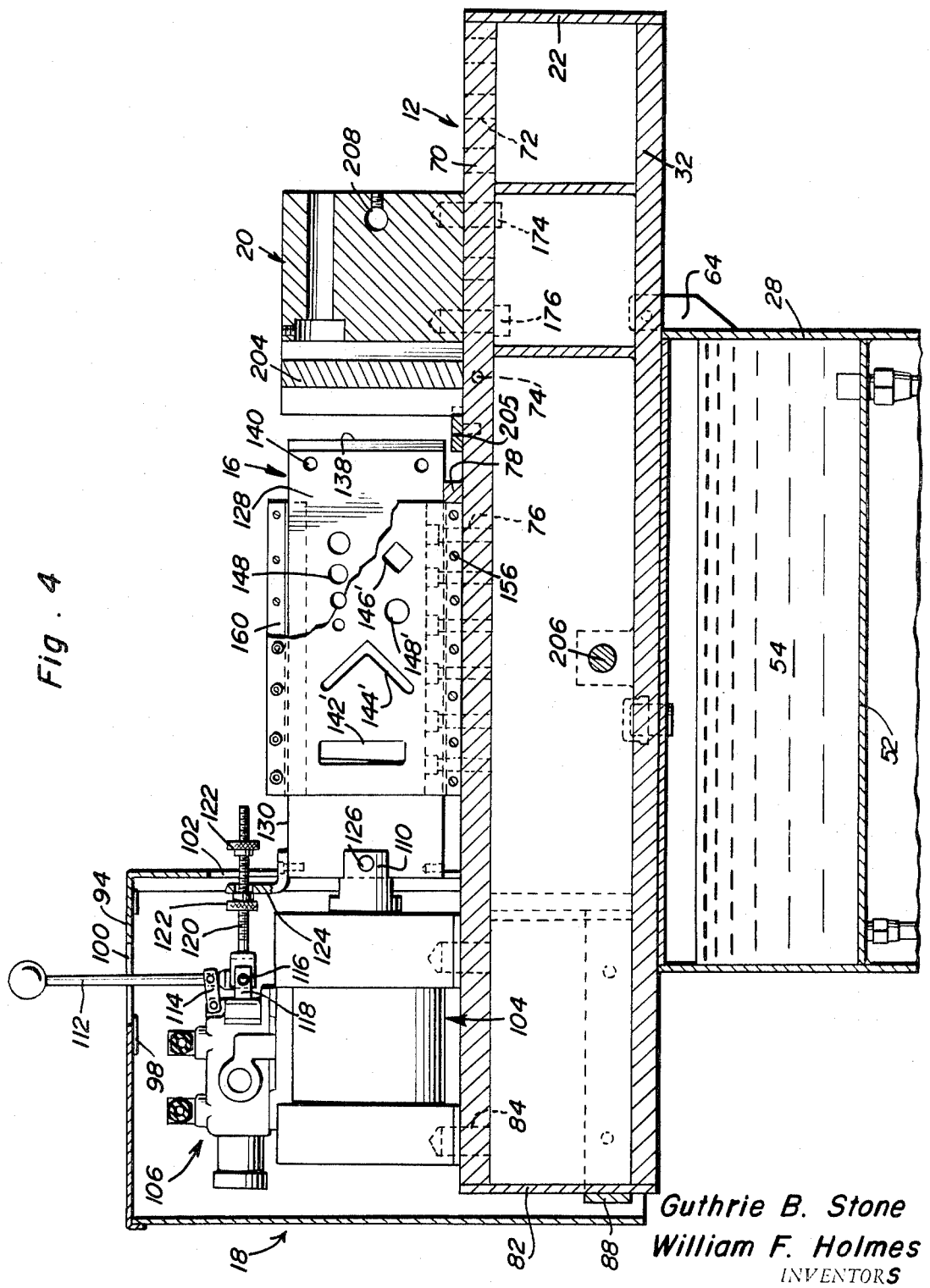
FIG. 4 is a partial side sectional view taken substantially through a plane indicated by section line 4—4 in FIG. 3.

Referring now to the drawings in detail, FIGS. 1 and 2 illustrate the metal forming machine which is generally denoted by reference numeral 10. The machine may be utilized in a horizontal position as shown in FIG. 1 and in a vertical position as shown in FIG. 2. In FIG. 1, the machine is shown set up for bending operations while in FIG. 2 the machine is shown set up for punching operations. As will be explained hereinafter, the machine may also be conditioned for other metal forming operations such as shearing. The vertical and horizontal positioning involves pivotal displacement of an elongated bed generally referred to by reference numeral 12 relative to a mobile base generally referred to by reference numeral 14. The bed mounts a reciprocable ram assembly generally referred to by reference numeral 16 advanced from a retracted position by power operated piston means within an enclosure secured to the bed and generally referred to by reference numeral 18. The ram assembly is advanced toward a base die block generally referenced to by reference numeral 20 adjustably positioned on the bed closer to end 22 opposite the end on which the housing enclosure 18 is mounted. By means of handles 24, projecting laterally from the housing 18, the bed 12 may be pivotally displaced between a horizontal position resting on a top supporting surface portion 26 of the base and a vertical position engaging an end panel 28 of the base 14 on which angularly displaced lock elements 30 are mounted for embracing the lower flange portion 32 of the bed as shown in FIG. 2 in order to hold the bed in its vertical position.

Figure 9:
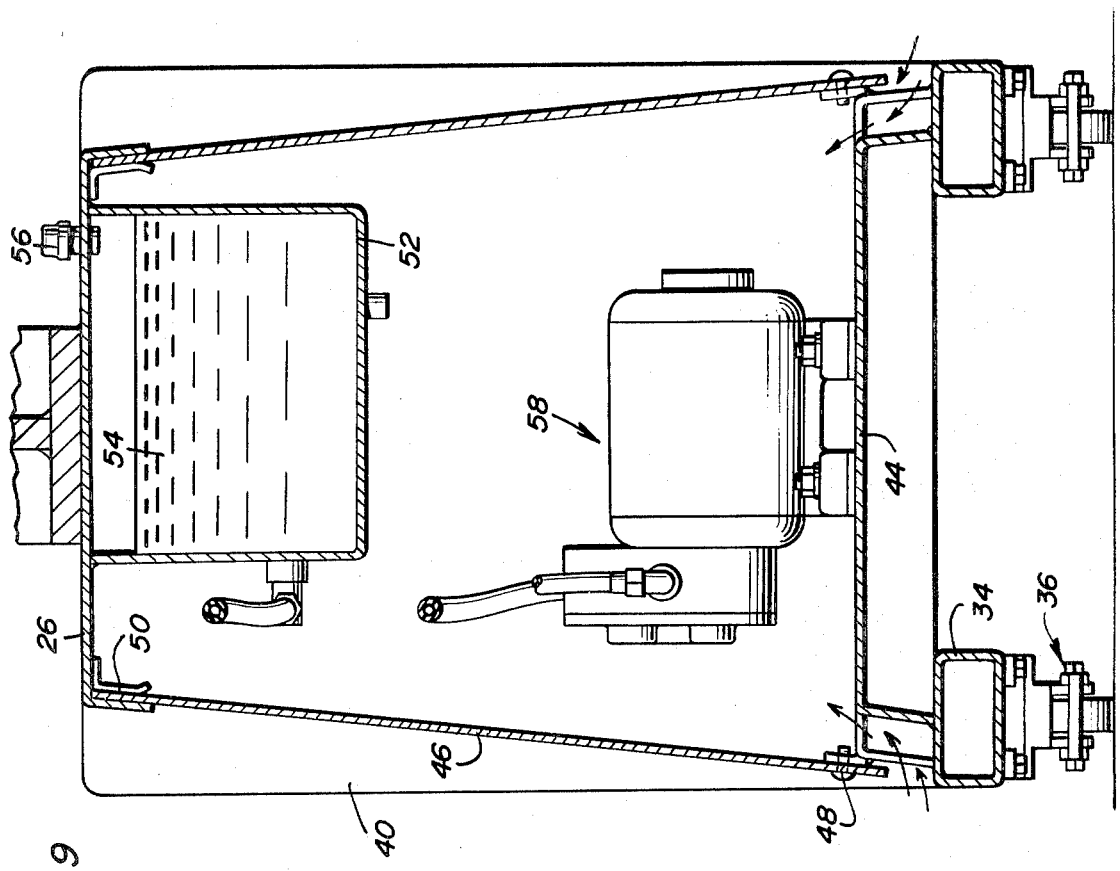
FIG. 9 is an enlarged partial sectional view taken substantially through a plane indicated by section line 9—9 in FIG. 1.

The end panel 28 is welded to and extends upwardly from a pair of parallel spaced rectangular support beams 34 having locking wheel assemblies 36 mounted adjacent opposite ends thereof for wheeled support of the machine. The panel 28 is spaced further from the ends 38 of the support beams than the spacing between the end panel 40 from the opposite ends 32 of the support beams for off-center mounting of an enclosure formed between the end panels 28 and 40. The end panels not only form part of the base enclosure but also interconnect the support beams 34 to form a rigid assembly therewith. The support beams are also interconnected by a bottom member 44 as shown in FIG. 9 to which a pair of upwardly converging side panels 46 are secured by fasteners 48. The enclosure formed by the bottom member 44, the end panels 28 and 40 and the side panels 46, is closed at the top by the top supporting cover portion 26 aforementioned which extends between the end panels 28 and 40 and is held in place on the side panels 46 by retainer clips 50. Suspended from the top cover portion 26, and also extending between the end panels 28 and 40, is a reservoir tank 52 containing a fluid pressure medium 54 such as oil. A removable filler cap and fitting 54 is accordingly mounted on the top cover portion 26 for replacing any oil lost through leakage. Supported within the base enclosure on the bottom member 44 will be any suitable pressure generating equipment such as the motor operated pump assembly 58 to which electrical power is brought through a switch control box 60 as shown in FIGS. 1 and 5. The end panel 40 is accordingly provided with a ventilation opening 62. The end panel 28 of the base enclosure as more clearly seen in FIGS. 3 and 5, have a pair of pivot brackets 64 welded thereto and projecting upwardly therefrom on either side of the bed 12. A pivot shaft 66 extends between the pivot brackets 64 through the bottom flange 32 of the bed so as to establish a pivotal axis for the bed adjacent the upper edge of the end panel 28. Thus, the bed 12 overhangs the panel 28 in its horizontal position so that when it is displaced to the vertical position engaging the panel 28, the lock elements 30 may be turned into engagement with the lower flange 32 adjacent the end 22 of the bed. A substantially balanced arrangement is thereby obtained in both the horizontal and vertical positions of the bed.

The bed 12 is in the shape of a cross-sectional I-beam with the lower flange 32 thereof interconnected by a central web 68 with a work supporting surface flange 70 as more clearly seen in FIGS. 6 and 7. As shown in FIGS. 3 and 4, the work supporting flange 70 of the bed is provided with two parallel rows of spaced openings 72 that extend from the end 22 for adjustable positioning of the base die block 20. The pair of openings 72 furthermost from the end 22, are associated with laterally extending setscrew bores 74. The work supporting flange 70 is also provided with threaded bores 76 of smaller diameter than the openings 72 as shown by dotted line in FIG. 4 for guide mounting purposes as will be explained hereafter. A guide stop bar 78 is welded to the flange 70 and a work supporting surface 80 is presented on the flange 70 between the stop bar and the die block 20 in the horizontal position of the bed. Adjacent the end 82 of the bed opposite the end 22, two pair of openings 84 are formed in the flange 70 as shown in FIGS. 4 and 8, these openings being enclosed within the housing 18.

With continued reference to FIGS. 4 and 8, the housing 18 is secured by fasteners 86 to a framing bar 88 that projects laterally from the bed to which it is secured as by welding to the braces 90 and 92 extending between the flanges 32 and 70 of the bed on opposite sides of its longitudinal axis. The handles 24 are secured to the housing in alignment with the frame bar 88 by means of which the housing is securely affixed to the bed. The housing is provided with a corner opening which is closed by a guard cover 94 which is removably mounted on the housing by means of the side flanges 96 and a lock bar 98 as shown in FIGS. 1–4. One right angle portion of the guard cover is provided with a slot 100 while a notch 102 is provided at the edge on the other right angle portion of the guard cover.

The housing 18 encloses a hydraulic cylinder-piston device 104 as shown in FIG. 4 on which a four-way valve 106 is mounted. The piston-cylinder device 104 is secured to the flange 70 of the bed by fasteners extending through the openings 84. Fluid under pressure from the motor pump assembly is supplied through hose 108 as shown in FIGS. 3 and 5 to the piston cylinder device to cause axial movement of the piston rod 110 projecting from the housing below the guard cover. Control over this movement is exercised through a valve actuating lever 112 that is pivotally connected by the link 114 to the casing of the four-way valve 106 and by means of pin 116 to the valve stem 118 of the four-way valve. Also connected to the valve stem by pin 116, is a stroke limit rod 120 having a threaded end portion projecting forwardly through the notch 102 in the guard cover 94 out of the housing. Adjustably positioned nuts 122 are mounted on the stroke limit rod 120 as shown in FIG. 4 for abutment with a right angled stop element 124 through which the rod 120 extends in order to limit the stroke of the piston rod 110 and the ram assembly 16 to which the piston rod is connected by pin 126 in both the forward and return directions.

The ram assembly 16 includes a rectangular blade member 128 having parallel longitudinal edges 130. As shown in FIGS. 4 and 10, the longitudinal edges 130 are provided with threaded bores 132 adjacent the rear end 134 for removably mounting the stop element 124 thereon. An opening 136 is provided adjacent the end 134 to receive the connecting pin 126 through which the piston rod is connected to the blade member. It will be apparent, that the blade member is reversibly connected to the piston rod so that either longitudinal edge 130 may have the stop element 124 mounted thereon. The forward end 138 of the moving blade member is in the form of a converging bending edge utilized in a bending operation. A pair of openings 140 are, however, mounted adjacent the forward edge 138 for mounting a tool carrying adapter as will be explained hereafter. For shearing purposes, a plurality of openings are formed in the blade member including a laterally extending flat bar stock opening 142, an angle bar opening 144, a square bar opening 146 and a plurality of different diameter rod openings 148.

The moving blade member as shown in FIGS. 3, 4 and 6, is mounted in sliding contact with a fixed blade member 150. The fixed blade member is clamped between a lower, elongated guide member 152 and a backing element 154 by means of a plurality of fasteners 156 as more clearly seen in FIG. 6. The lower guide member 152 and backing member 154 are secured to the flange 70 of the bed by a plurality of fasteners 158 extending into the openings 76 aforementioned. Secured by fasteners 158 to the fixed blade member 150 adjacent its upper longitudinal edge, is an upper guide member 160. The forward ends of the guide members and backing member 154 abut the stop 78 aforementioned and guide movement of the moving blade member 128 along either edge 130 between a retracted position and a forward position to which it is limited by the limit stop element 124 aforementioned. In the retracted position, the different cross-sectional stock shape openings 142, 144, 146 and 148 of the blade member 128 are aligned with corresponding openings 142', 144', 146' and 148' formed in the fixed blade member 150. It will therefore by apparent, that stock of appropriate cross-sectional shape when inserted through the aligned openings in the blade members, will be sheared when the movable blade 128 is advanced forwardly from its retracted position by operation of the cylinder piston device.

Referring now to FIGS. 3, 5 and 6, a stock guide plate 162 is fixedly mounted by fasteners 164 extending through adjustment slots 166 into the longitudinal edge of the flange 70 in parallel spaced relation to the fixed blade 150. The stock guide plate is firmly held in adjusted position by an adjustment bolt 168 that is fastened adjacent the forward end of the stock guide plate for threaded reception within a nut element 170 welded to and projecting laterally from the longitudinal edge of the flange 70. In this manner, stock openings in the stock guide plate may be accurately aligned with corresponding openings in the blade members 128 and 150. The stock guide plate is provided with corresponding stock openings 142'', 144'', 146'' and 148'' and a bar support member 172 secured to and extending laterally therefrom at right angles for supporting bar stock which is to be positioned through the aligned openings 142'' 142' and 142 in the stock guide plate, the fixed blade member 150 and the moving blade member 128. It will therefore be apparent, that shearing operations may be performed producing an accurate square-cut by virtue of the stock support provided by the adjustable stock guide plate which also facilitates stock positioning.

As hereinbefore indicated, the base die block 20 is utilized for bending and punching purposes. It is fixedly mounted in an adjusted position by a pair of locating pins 174 as shown in FIG. 5 extending through the openings 72. A pair of screw fasteners 176 secure the die block in position as more clearly seen in FIG. 7. A work supporting surface 178 is thereby established for the machine when the bed 12 is in a vertical position as shown in FIG. 2. The surface 178 is also provided with a recess within which a punch die 180 may be mounted and held in place by a setscrew 182 as more clearly seen in FIG. 5. The punch die 180 when utilized, will be aligned with a punch element 184 mounted on the forward end of the movable blade member 128 by an adapter 186. As shown in FIG. 12, the adapter includes a pair of mounting portions 188 which straddle the forward end portion of the moving blade 128 and are provided with openings 190 aligned with the openings 140 in the moving blade through which fasteners 192 extend as shown in FIG. 5 to secure the adapter to the moving blade. A two-piece punch carrying plate assembly 194 is provided with a threaded opening 196 to hold the punch element 184. The plate assembly is held together by bolts 195 and may be changed in thickness for adjustment purposes. For punching operations, a stripper plate 198 is also utilized. The stripper plate is held in proper position between the punch die 180 and the punch element 184 as shown in FIG. 5 by a pair of mounting rods 200 adapted to be received within the forwardmost openings 72 in the top flange 70 of the bed with which the setscrew bores 74 are associated as hereinbefore indicated with respect to FIG. 3. Setscrews 202 accordingly hold the stripper plate in position on the bed as shown in FIG. 5. Punching operations may therefore be conveniently performed with the bed in a vertical position as shown in FIG. 2.

Bending operations may be performed by positioning a forming die block 204 against the surface 178 of the die block 20 acting as a thrust absorbing surface in the horizontal position of the bed 12 as shown in FIGS. 1 and 3. The forward bending edge 138 of the moving blade member 138 may thus cooperate with the bending die block 204 for bending purposes. A calibrated retainer 205 may be mounted on the bed as shown in FIGS. 3 and 4 for holding the die block 204 in abutment with the block 20. The retainer also serves as a quick bending rule.

In performing the various operations aforementioned, a stock gauge assembly 206 may be utilized. The stock gauge assembly is accordingly, alternatively mounted by openings extending through the bed 12 as shown in FIGS. 1 and 3 or by mounting within an opening 208 formed in the base die block as shown in FIGS. 2 and 5. Further, the control handle 112 for operating the machine extends conveniently from the housing guard 94 in an upward direction when the bed is in a horizontal position as shown in FIG. 1 while it extends forwardly from the machine when the bed is in a vertical position as shown in FIG. 2. Further, the arrangement of the machine is such as to provide access on all three sides of the ram assembly 16 since guiding support for the ram assembly is provided only by the bed which acts as a supporting column in its vertical position and as a work supporting and aligning surface in its horizontal position.

Figure 13:
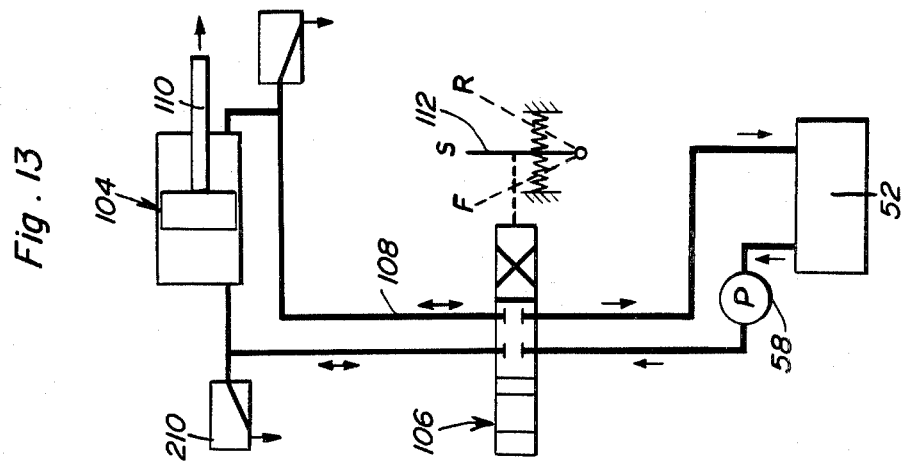
FIG. 13 is a simplified hydraulic circuit diagram associated with a power operated piston mechanism for operating the machine.

The control member 112 as diagrammatically shown in FIG. 13 is biased to a neutral position so as to normally hold the four-way valve 106 in a position blocking flow of fluid to the piston-cylinder device 104 thereby holding the ram assembly or movable blade 128 in whatever position to which it was advanced. Displacement of the control lever 112 will therefore either advance or retract the ram assembly by reversible supply and exhaust of fluid from opposite ends of the cylinder to which adjustable relief valve devices 210 are connected for pressure relief purposes at the ends of the piston stroke. Thus, smooth and controllable advancement and retraction of the ram assembly may be effected under control of the control lever 112 with such movement being overruled by the limit stop assembly hereinbefore described automatically returning the valve stem to the neutral position as illustrated in FIG. 13 to stop movement of the piston rod. In view of the infinite stroke adjustment capability of the stroke adjustment assembly and pressure relief valve means, great flexibility in bending operations is provided including repetitive bending of identical degree bends. A substantial press capacity with ample die space is also provided in view of the adjustable positioning of the base die block which also enables the use of special bending dies and notching and coping dies. The reversible mounting of the moving and fixed blades and the stock guide plate, also prolongs the useful life of these elements. The convenience of the machine in connection with its multifunction purpose, is furthermore enhanced by the alternate positioning of the bed between vertical and horizontal positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. In a machine for deforming a workpiece, a supporting base, an elongated bed, a thrust absorbing block fixedly mounted on the bed, a movable blade, guide means secured to the bed in spaced relation to the block for slidably mounting the movable blade, power operated means connected to the blade for advancement thereof toward the block, and means pivotally connecting the bed to the base for displacement of the bed and the blade between horizontal and vertical positions, each of said block and bed having a leveled work supporting surface in the vertical and horizontal positions of the bed respectively on which the workpiece may be positioned.

2. The combination of claim 1 including a fixed shearing blade secured to the guide means in sliding contact with the movable blade, said blades having stock receiving openings aligned with each other in a retracted position of the movable blade.

3. The combination of claim 2 including lock means mounted by the base and engageable with the bed for holding the same in the vertical position, said base having a horizontal surface portion supporting the bed in the horizontal position.

4. The combination of claim 3 including a stock guide plate secured to the bed in parallel spaced relation to the fixed blade.

5. The combination of claim 4 wherein said base includes horizontal support means, and a housing mounted in off-center relation on said support means, said bed being supported on the housing overhanging the same in the horizontal position and in engagement therewith in the vertical position in balanced relation to the support means.

6. The combination of claim 5 including means secured to the bed enclosing the power operated means in spaced relation to the pivotal connecting means, said power operated means having a manual control element projecting from the enclosing means vertically upward and horizontally forward in the horizontal and vertical positions of the bed respectively 7. The combination of claim 6 wherein the power operated means further includes stop means connected to the movable blade for limiting said advancement thereof.

8. The combination of claim 1 including lock means mounted by the base and engageable with the bed for holding the same in the vertical position, said base having a horizontal surface portion supporting the bed in the horizontal position.

9. The combination of claim 8 wherein said base includes horizontal support means, and a housing mounted in off-center relation on said support means, said bed being supported on the housing overhanging the same in the horizontal position and in engagement therewith in the vertical position in balanced relation to the support means.

10. The combination of claim 1 wherein said base includes horizontal support means, and a housing mounted in off-center relation on said support means, said bed being supported on the housing overhanging the same in the horizontal position and in engagement therewith in the vertical position in balanced relation to the support means.

11. The combination of claim 1 including means secured to the bed enclosing the power operated means in spaced relation to the pivotal connecting means, said power operated means having a manual control element projecting from the enclosing means vertically upward and horizontally forward in the horizontal and vertical positions of the bed respectively.

12. The combination of claim 11 wherein the power operated means further includes stop means connected to the movable blade for limiting said advancement thereof.

13. The combination of claim 2 including a stock guide plate secured to the bed in parallel spaced relation to the fixed blade.

14. In a machine for deforming a workpiece, a supporting base, an elongated bed, a single movable blade having a work engaging end, guide means secured to the bed for slidably mounting the movable blade, power operated means connected to the blade for advancement thereof, means pivotally connecting the bed to the base for displacement of the bed and the blade between horizontal and vertical positions, and a fixed shearing blade secured to the guide means in sliding contact with the movable blade, said blades having stock receiving openings aligned with each other in spaced relation to said work engaging end in a retracted position of the movable blade.

15. The combination of claim 14 including a stock guide plate secured to the bed in parallel spaced relation to the fixed blade.

16. The combination of claim 14 including means secured to the bed enclosing the power operated means in spaced relation to the pivotal connecting means, said power operated means having a manual control element projecting from the enclosing means vertically upward and horizontally forward in the horizontal and vertical positions of the bed respectively.

17. In a multipurpose machine for shearing, punching and bending a workpiece, a supporting base, an elongated bed, a thrust absorbing block fixedly mounted on the bed, a single movable blade, guide means secured to the bed in spaced relation to the block for slidably mounting the movable blade generally parallel to the bed, power operated means connected to the blade for advancement along a path intersecting the block, means pivotally connecting the bed to the base for displacement of the bed and the blade between horizontal and vertical positions, each of said block and bed having a leveled work supporting surface in the vertical and horizontal positions of the bed respectively, and means for interchangeably mounting work engaging implements on the movable blade, bed and block.

18. The combination of claim 17 wherein said work supporting surface of the bed is provided with a plurality of longitudinally spaced holes and fastening means received in said holes for fixedly mounting the block in a longitudinally adjusted position on the bed.

19. The combination of claim 18 including a stripper having mounting rods adapted to be received in said holes, said stripper constituting one of the work-engaging elements.

20. The combination of claim 17 wherein one of the working engaging elements is a bending die supported on the bed in the horizontal position thereof and a retainer holding the bending die in abutment with the block.

* * * * *